(12) United States Patent
 Fislage

(10) Patent No.: US 8,412,921 B2
(45) Date of Patent: Apr. 2, 2013

(54) CONTROL DEVICE FOR A VEHICLE AND METHOD FOR A DATA UPDATE FOR A CONTROL DEVICE FOR A VEHICLE

(75) Inventor: Markus Fislage, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 162 days.

(21) Appl. No.: 12/737,711

(22) PCT Filed: Jul. 6, 2009

(86) PCT No.: PCT/EP2009/058503
§ 371 (c)(1),
(2), (4) Date: Apr. 27, 2011

(87) PCT Pub. No.: WO2010/020465
PCT Pub. Date: Feb. 25, 2010

(65) Prior Publication Data
US 2011/0208956 A1    Aug. 25, 2011

(30) Foreign Application Priority Data
Aug. 20, 2008   (DE) .................. 10 2008 041 360

(51) Int. Cl.
*G06F 9/00* (2006.01)
*G06F 9/44* (2006.01)
*G06F 15/177* (2006.01)
(52) U.S. Cl. ............... 713/2; 713/1; 713/100; 717/168
(58) Field of Classification Search ............. 713/1, 2, 713/100; 717/168
See application file for complete search history.

(56) References Cited

U.S. PATENT DOCUMENTS

| | | | | |
|---|---|---|---|---|
| 5,210,854 | A * | 5/1993 | Beaverton et al. | 717/174 |
| 6,040,829 | A * | 3/2000 | Croy et al. | 715/864 |
| 7,293,115 | B2 * | 11/2007 | DaCosta et al. | 710/8 |
| 2004/0203317 | A1 * | 10/2004 | Small | 446/476 |
| 2007/0288914 | A1 * | 12/2007 | Brannock et al. | 717/169 |

FOREIGN PATENT DOCUMENTS

| | | |
|---|---|---|
| DE | 44 25 388 | 1/1996 |
| EP | 0 642 090 | 3/1995 |
| EP | 1 701 262 | 9/2006 |

* cited by examiner

*Primary Examiner* — Mark Connolly
(74) *Attorney, Agent, or Firm* — Kenyon & Kenyon LLP

(57) ABSTRACT

A control device for a vehicle and a method for a data update for a control device for a vehicle are provided, in which a first memory is provided that has a first area in which a bootloader is provided and that has a second area in which at least one application program is provided. Furthermore, a second memory is provided, in which first data for the at least one application program are provided. Furthermore, an interface is provided that provides second data for an update at least of one part of the first data. In addition, a control circuit is provided that calls up the bootloader for the update of the at least one part of the first data by the second data. The bootloader extracts from the second area of the first memory third data that indicate the third area of the second memory in which the second data for the update are to be written.

16 Claims, 3 Drawing Sheets ns, for example, for updating data for a control device for a vehicle and a method for updating data for a control device for a vehicle.
CONTROL DEVICE FOR A VEHICLE AND METHOD FOR A DATA UPDATE FOR A CONTROL DEVICE FOR A VEHICLE

BACKGROUND OF THE INVENTION

1. Field of the Invention

The present invention relates to a control device for a vehicle and a method for a data update for a control device for a vehicle.

2. Description of Related Art

A method and a device for rewriting a sector having bootloader software in a sector-deletable, non-volatile semiconductor memory is already known from published European patent document EP 1 701 262 B1. In this context, it is specified that a so-called bootloader code is provided in a first sector of a non-volatile memory for a controller. During the start-up, this bootloader software is loaded and brings about the initialization of the hardware of the controller, for example, the interfaces, so that an application program is able to make use of these interfaces.

SUMMARY OF THE INVENTION

In contrast, the control device according to the present invention for a vehicle and the method according to the present invention for updating data for a control device for a vehicle have the advantage that now a high flexibility exists in the selection of areas of a memory in which data are updated, the data being used by an application program in its operation. This is achieved in that the data that specify the area in which the data are to be updated are stored with the application program in the same area of an additional memory. Thus, it is possible to update these data by updating the application. This flexibility makes it possible to not reserve any memory space for a buffering, since it is possible to select any areas in the memory in which the data are updated. Apart from this, it is possible to implement only those update processes that update in a targeted manner only that which is also required. In particular, the subject matter of the independent claims makes it possible for only the second memory having the data for the application, normally an EEPROM, to be updated, with regard to its data.

This makes it possible to easily make improvements to data retrospectively, for example, through a garage visit or via remote servicing, if control devices are already installed, for example, in vehicles. A great deal of flexibility is provided by the present invention. Through the flexible selection of address areas in the second memory, i.e., the EEPROM, this memory area may be used optimally. As described above, it is no longer necessary to additionally reserve free memory space. Through this flexibilization, it is possible to update even unexpected selective data areas in the second memory. Every conceivable correction of this memory content becomes possible.

Thus, a more cost-effective, more flexible control device and a corresponding method are possible.

In the case at hand, a control device is an electric device that processes sensor signals and generates continuous signals as a function thereof. In the case at hand, in particular it may be an airbag control device, a control device for vehicle dynamics control, or a motor control device. But other control devices inside or outside of a vehicle are also possible.

The first memory has the first area, in which the bootloader is provided. This first area is normally protected from an update, in order to allow for a repeated re-programming of the remaining memories. The instrument for this re-programming or data update is the bootloader, consequently a software. This first memory is designed as a ROM (read only memory), for example, and in this context is typically implemented as a non-volatile semiconductor memory. However, all other suitable memory technologies are also possible. This first memory has a second area that differs from the first area, and at least one application program is stored in this area. For example, this application program is an airbag algorithm in an airbag control device. In another control device, it may be other programs such as a vehicle dynamics control or a motor control or the operation of a communication device. Further application possibilities are possible in the case at hand.

The second area of this first memory may be updated with new data. In non-volatile semiconductor memories, the so-called flash storage may be used for this purpose. In flash memories, it is often only possible to delete entire sectors at once. This is where the name flash comes from, which refers to the deletion of the memory, which occurs in blocks. The storage also takes place in larger blocks.

In the case at hand, the invention is characterized by the fact that the data that indicate to the bootloader the area of an additional memory, for example, an EEPROM, in which the data to be updated are to be stored are stored in the application program. As follows from the dependent claims, the application program, and thus these data, which indicate by indexing where the data in the additional memory are to be updated, may also be updated. However, these data exist in the first area of the first memory and thus are not flexible.

The second memory may likewise be updated via a flash memory, for example; it is primarily an EEPROM. The first data, which the application program requires for its operation, are stored in this second memory. In the case of an airbag algorithm, this data is, for example, the algorithm parameters or also equipment features, i.e., which hardware exists in the case at hand, diagnosis data, day type numbers, version names, etc. These data may then be provided in this second memory in so-called sections, which contain related data.

The first and the second memory may be implemented on different or shared semiconductor modules. The only requirement is that the two memories are logically separated from each other.

For example, the interface is hardware and/or software that provides the data that is supplied from outside for the update of at least one part of the first data. That is, not all first data in the second memory, that is, the EEPROM, have to be updated, but rather it is also possible for only one part of it or parts that are separated from each other to be updated. The interface may be designed as a so-called CAN transceiver or another data transmission interface, for example. The interface then transmits these data, for example, for a processor that is called a control circuit in the case at hand.

The control circuit may be all possible forms of processors, in particular, also microcontrollers that have at least one or also more central processing units. The control circuit calls up this bootloader at the beginning so that when the data from outside are provided by the interface, it can use these second data that are provided from outside to perform the update of at least one part of the first data. The activation of the control circuit is usually ensured via a control interface in the form of a protected area in the EEPROM or in a non-erasable RAM area.

The bootloader, which is already defined in the related art, for example, is a program that performs at least this update and is provided in the first memory area of the first memory. To this end, the bootloader retrieves from the second area of the first memory, that is, from the application program, the third data, which indicate the third area of the second memory in which the second data for an update are to be written. This third area in the second memory, that is, in the EEPROM, may contain connected or also a plurality of partial areas. In the extreme case, this can mean the entire area of the second memory. An update describes an overwriting of the old data by the new data that were provided from outside.

Advantageous improvements of the control device for a vehicle and for a data update for a control device for a vehicle are rendered possible by the measures and further refinements recited in the dependent claims.

It is advantageous that the third data indicate at least one first connected address area of memory addresses in the second memory. As specified above, the third data indicate where in the second memory the new data are to be written. This writing can mean deleting and rewriting. This connected address area allows for the definition of a logically connected area of memory addresses. This reduces the susceptibility to errors relative to the use of direct memory addresses. The memory addresses address individual memory cells of a semiconductor memory, for example.

It is furthermore advantageous that the bootloader updates the at least one application program and thus the third data using the second data, that is, the update data. This was already mentioned above, that the application program itself, for example, the airbag algorithm, can be updated using the procedure described; however, then the memory areas that are to be overwritten in the process are provided, for example, in the form of a list or matrix, in the first area of the first memory, where the bootloader is also disposed. That is, this first area of the first memory ROM is provided permanently and cannot be overwritten. This now also makes it possible, however, to update only the third data using the described method. Thus, the address areas in second memory EEPROM can be redistributed in order to flexibly correspond to new conditions. For example, if it turns out that a certain memory area in second memory EEPROM is to contain a new data set, but this memory area is presently not written and not indexed, with regard to its address area, in the application program, then this can be done at this point using the present measure, so that from this point on it is possible to address in a targeted manner each address area in the second memory.

In addition to this, it is advantageous that in the first area of the first memory fourth data are provided that indicate at least one second connected address area of the memory addresses in the first memory. This was already described above, namely that in the first area the address area in the first memory is specified in the second area in which the application program is to be updated by the second data.

It is furthermore advantageous that the bootloader has a consistency check module, the consistency check module checking at least one part of the first data, which are stored in the second memory, in the respective first address areas to see whether the at least one application program expects this part of the first data in these respective address areas. The consistency check is necessary so that faulty loading processes in the second memory may be ascertained prior to using the application program, in order to avoid a faulty functioning of an application program that is sensitive, for example. This is in particular of utmost importance in an airbag triggering algorithm, for example. The consistency check module can check at least one part of these first data in the second memory, to see whether these first data were respectively-stored at the right address areas. This can be examined by checking a mark, for example, at the beginning of the respective address areas, and/or a check sum, for which, for example, the known CRC method may be used, and/or a format check in the respective first address areas. The format check can check, for example, a length of the stored data, which is known in the application program. Likewise, layout information and CRC protections that the application uses may also be used in the bootloader for the consistency check. In the layout information, typically a layout ID is introduced, which is incremented whenever the format of an area changes. A return to the application is only possible if this check is positive.

Advantageously, as already indicated above, the first memory is a so-called ROM and the second memory is an EEPROM, the two preferably designed as non-volatile semiconductor memories.

Exemplary embodiments of the present invention are illustrated in the drawing and are explained in greater detail in the following description.

DETAILED DESCRIPTION OF THE INVENTION

Figure 1:
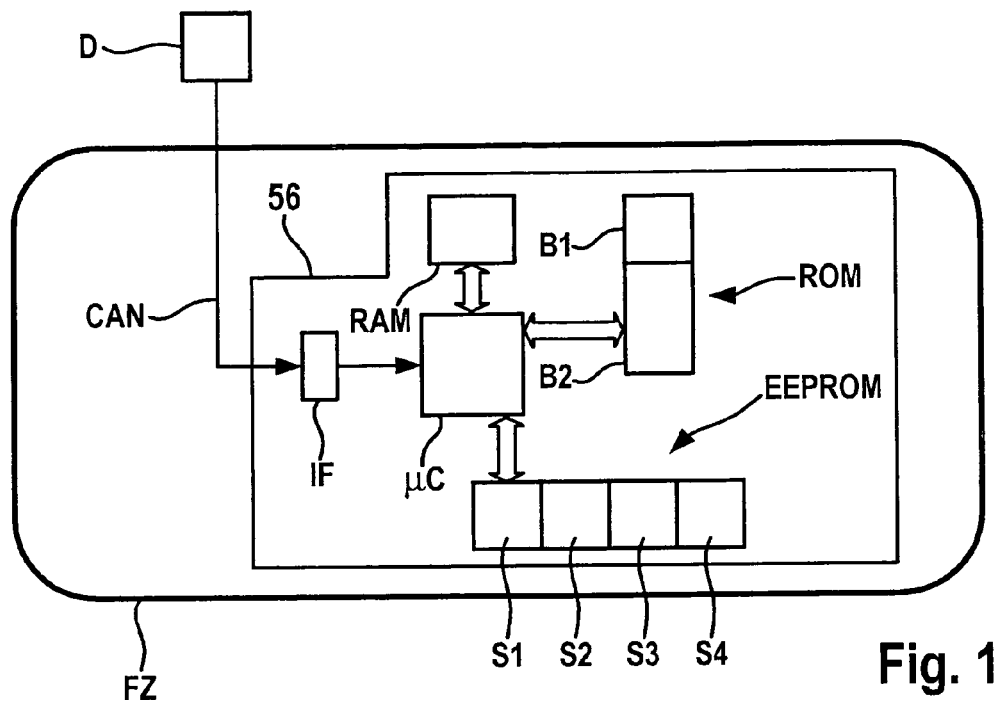
FIG. 1 shows a block diagram of the control device according to the present invention having connected components.

FIG. 1 illustrates in a block diagram control device SG according to the present invention in a vehicle FZ having a connected component, a diagnosis device D, which is connected from outside of vehicle FZ via a CAN bus CAN. In the case at hand, only the components of the control device and its connected periphery that are necessary to gain an understanding of the present invention are described. Additional components necessary for the operation of control device SG are omitted for the sake of simplicity.

Diagnosis device D, for example, a computer in a garage or also a computer via remote servicing, in which case the connection with CAN bus CAN is established via a radio link, for example, transmits update data to control device SG and in the process to a CAN transceiver IF as the interface. CAN transceiver IF formats the data for a transmission format suitable in the control device in order to microcontroller µC Microcontroller µC detects the new data, which are provided for an update of data in the ROM and/or the additional memory EEPROM. These data are input and verified depending on the sequence. Additionally, a consistency check is implemented in order to ensure that areas that were not explicitly written are still in order and are suitable for the application. This must be satisfied for the application to be started again.

Microcontroller µC calls up the bootloader for the update from the first non-deletable area B1 of first memory ROM and loads it in working memory RAM, for example. The bootloader updates the memory content of first memory ROM and of second memory EEPROM with the new data, in that for the update of first memory ROM [it] extracts from first area B1 the memory areas that may be updated, namely area B2, in which the application program is situated and also the data that specify which areas are to be updated in second memory EEPROM.

After the update of first memory ROM, now second memory EEPROM is updated. For this purpose, the bootloader extracts from second area B2 the memory areas that are to be updated in second memory EEPROM. For example, in the case at hand four sections S1, S2, S3, and S4 of second memory EEPROM are illustrated, which may be updated as a whole in accordance with the data in second area B2 of first memory ROM. The bootloader thus updates the data in second memory EEPROM in accordance with the address data from second area B2. Second memory EEPROM has the data that the application program requires in area B2 for its operation. These data are algorithm parameters, equipment features, variant numbers, and the like, for example.

After the conclusion of this update, the bootloader now performs a consistency check of the updated data in first memory ROM and second memory EEPROM. This consistency check can be implemented by individual measures or a combination of the following measures:

1. Checking a Mark

In this context a so-called mark, which is situated at the beginning of each memory area S1, S2, S3, and S4, is read and checked to see whether this mark is expected at this memory location. These data, whether it is expected this way, are contained in the second memory area of first memory ROM. This consistency check may also be implemented for second area B2 of first memory ROM. Then, these data are contained in first area B1 and are approximately one byte long.

2. Check Sum Check

A so-called cyclic redundancy check (CRC) can be used for the consistency of the data in individual areas S1, S2, S3, and S4 and in second area B2. The CRCs are checked explicitly by the flash sequence. Additionally, all CRCs can be checked as a final check.

3. Format Check

Furthermore, it is possible to check the length of individual memory areas S1, S2, S3, and S4, these lengths then being contained in the second area of first memory ROM. This consistency check may also be implemented analogously for second memory area B2 of first memory ROM. Then, the lengths are contained in first memory area B1.

If this consistency check is successful, then it is possible to begin with the running of the application program.

Figure 2:
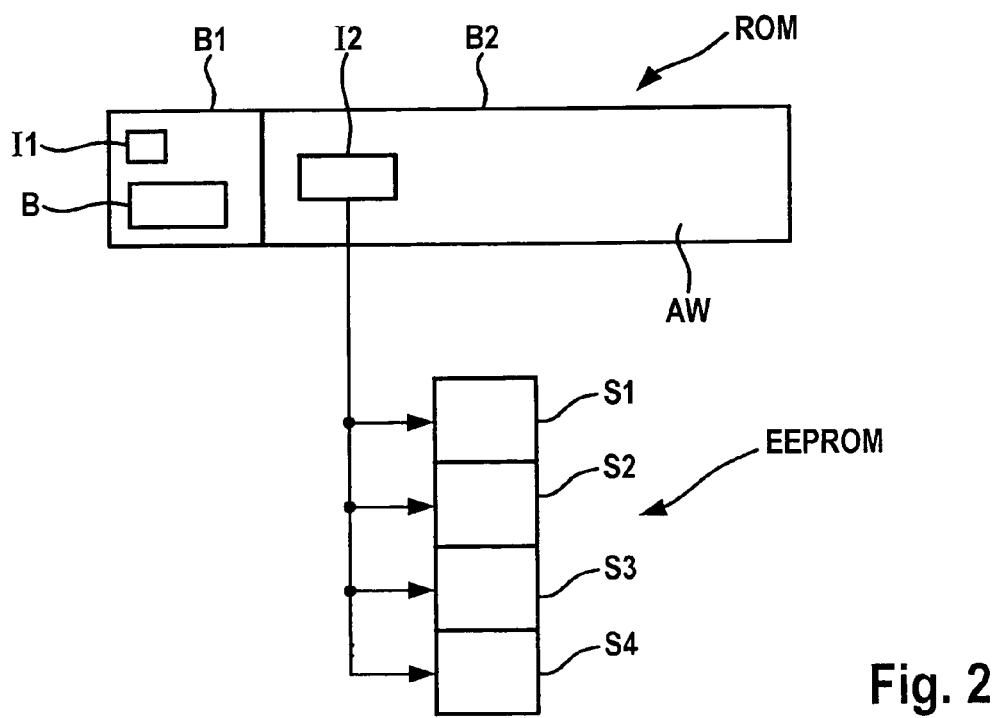
FIG. 2 shows a block diagram about the method according to the present invention.

FIG. 2 illustrates in a block diagram the sequence of the method according to the present invention and the situation of the corresponding data. The ROM has first area B1 and second area B2. Second area B2 contains application program AW. Application program AW likewise contains data I2, which indicate the memory areas along with the indexing in second memory EEPROM, namely S1, S2, S3, and S4. First memory area B1 contains indexing I1 for second memory area B2, and bootloader B as well. Additional programs may be provided. Because it is possible to update second memory area B2, indexing IC can also be updated in order to define new memory areas in EEPROM that are to be updated.

Individual memory areas S1, S2, S3, and S4 begin with so-called layout IDs that act as marks. These layout IDs, which are normally one-byte long, indicate what kind of memory area is currently involved. This may then be used later in the consistency check. An individual memory area may have a different length, for example, 10 bites. It is furthermore possible to store a dependency list as well that indicates which section format modification affects which sections S1, S2, S3, or S4.

Figure 3:
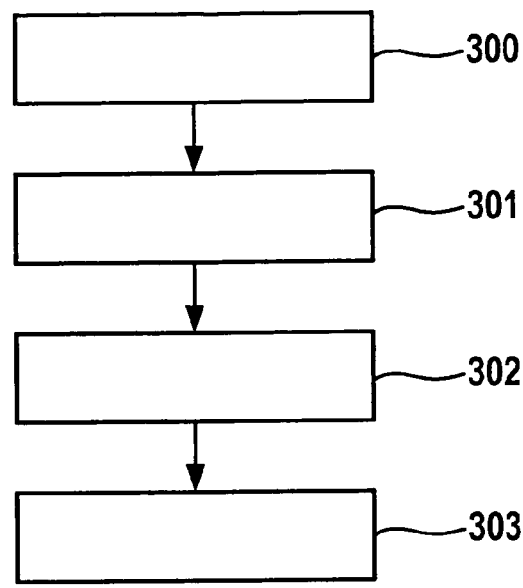
FIG. 3 shows a first flow chart of the method according to the present invention.

FIG. 3 shows the method according to the present invention in a flow chart. According to method step 300, the new data are imported via interface IF. Then the microcontroller calls up the bootloader in method step 301, in order to be able to carry out the update with these data. In method step 302, for this purpose the bootloader loads the indexing for the new data in the second memory EEPROM from the ROM, namely from the second memory area B2. Then the update of the indexed area with the new data takes place in the second memory EEPROM in method step 303.

Figure 4:
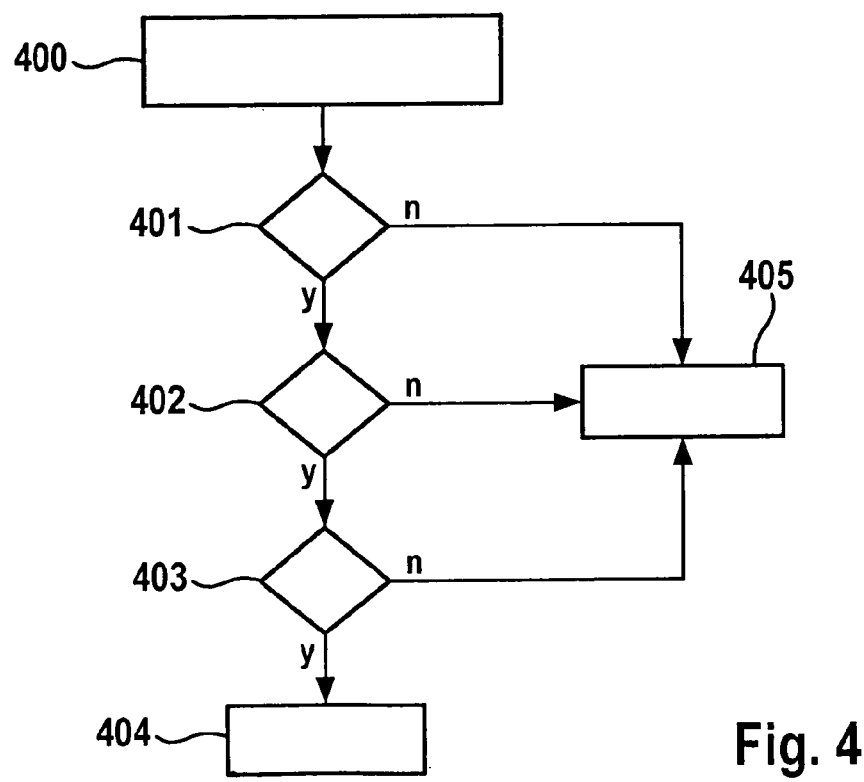
FIG. 4 shows a second flow chart of the method according to the present invention.

FIG. 4 shows an additional flow chart of the method according to the present invention. The consistency check begins in method step 400. This consistency check takes place after the update, as indicated in FIG. 3. In method step 401, the mark is checked to see whether this mark is expected at this memory location. If this is not the case, then the system branches back to method step 405 and an error is output. Then, the application program cannot be started.

If the mark was detected then the check sum is checked in method step 402. If the check sum test was erroneous, then the system continues with method step 405. If the check sum test was passed, then the system continues with method step 403. There, the format is checked, for example, the length of the existing memory area, which is defined by the mark. If this test was not passed, then the system continues with method step 405. If the format test was also passed, then the system continues with method step 404 and determines that the consistency exists, so that now application program AW may be started.

Figure 5:
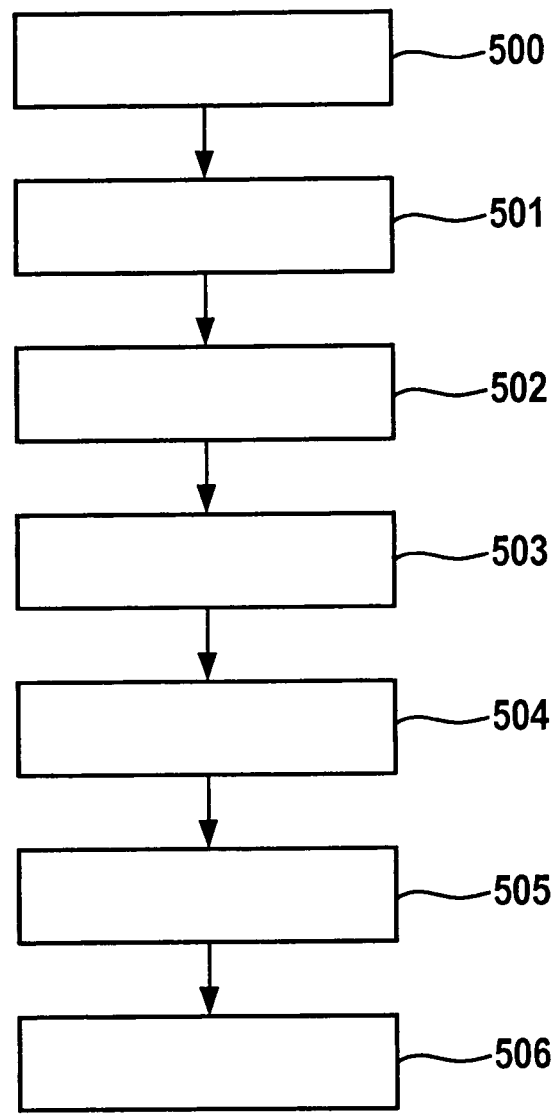
FIG. 5 shows a third flow chart of the method according to the present invention.

FIG. 5 shows an additional flow chart of the method according to the present invention. In method step 500, the new data are imported via interface IF. Then, as specified above, the bootloader is called up. In method step 502, the indexing is loaded from the ROM, namely now from the first area, in order to implement the new data for the updating of the second area, i.e., the application program, and the indexing for the second memory. This update is carried out in method step 503.

In method step 504, the bootloader extracts from the second area of the first memory, that is, the ROM, the indexing for the updating of the second memory, i.e., the EEPROM. The updating of these indexed areas takes place in method step 505. Then, as shown above, the consistency check takes place in method step 506.

What is claimed is:

1. A control device (SG) for a vehicle (FZ) comprising:
    a first memory (ROM) that has a first area (B1), in which a bootloader (B) is provided, and that has a second area (B2), in which at least one application program (AW) is provided
    a second memory (EEPROM), in which first data for the at least one application program (AW) are provided
    an interface (IF) that provides second data for an update of at least one part of the first data, and
    a control circuit (µC) that calls up the bootloader (B) for the update of the at least one part of the first data by the second data, the bootloader (B) extracting from the second area (B2) of the first memory (ROM) third data that indicate a third area (S1 to S4) of the second memory (EEPROM) in which the second data for the update are to be written.

2. The control device as recited in claim 1, wherein the third data indicate at least one first connected address area of memory addresses in the second memory (EEPROM).

3. The control device as recited in claim 2, wherein the bootloader (B) uses the second data on the at least one application program (AW) and thus updates the third data.

4. The control device as recited in claim 3, wherein in the first area (B1) of the first memory (ROM) fourth data are provided that indicate at least one second connected address area of the memory addresses in the first memory (ROM).

5. The control device as recited in claim 2, wherein the bootloader (B) has a consistency check module, and the consistency check module checks at least one part of the first data in the respective first address area to see whether the at least one application program (AW) expects this part of the first data in these respective address areas.

6. The control device as recited in claim 1, wherein the bootloader (B) uses the second data on the at least one application program (AW) and thus updates the third data.

7. The control device as recited in claim 6, wherein in the first area (B1) of the first memory (ROM) fourth data are provided that indicate at least one second connected address area of the memory addresses in the first memory (ROM).

8. The control device as recited in claim 7, wherein the bootloader (B) has a consistency check module, and the consistency check module checks at least one part of the first data in the respective first address area to see whether the at least one application program (AW) expects this part of the first data in these respective address areas.

9. The control device as recited in claim 6, wherein the bootloader (B) has a consistency check module, and the consistency check module checks at least one part of the first data in the respective first address area to see whether the at least one application program (AW) expects this part of the first data in these respective address areas.

10. The control device as recited in claim 1, wherein the bootloader (B) has a consistency check module, and the consistency check module checks at least one part of the first data in the respective first address area to see whether the at least one application program (AW) expects this part of the first data in these respective address areas.

11. The control device as recited in claim 10, wherein for the check, at least one of a mark, a check sum and a format is examined in the respective first address areas.

12. The control device as recited in claim 1, wherein the first memory (ROM) is a ROM and the second memory is an EEPROM.

13. A method for a data update for a control device for a vehicle, comprising:
 providing a first memory that has a first area (B1), in which a bootloader (B) is provided, and that has a second area (B2), in which at least one application program (AW) is provided
 providing a second memory (EEPROM), in which first data for the at least one application program (AW) are provided
 providing second data through an interface (IF) for an update of at least of one part of the first data
 calling up the bootloader (B) using a control circuit (µC) for the update of the at least one part of the first data by the second data, and
 extracting third data from the second area (B2) of the first memory (ROM) by the bootloader (B), a third data indicating the third area (S1 to S4) of the second memory (EEPROM) in which the second data for the update are to be written.

14. The method as recited in claim 13, wherein the third data indicate at least one first connected address area of memory addresses in the second memory (EEPROM).

15. The method as recited in 14, wherein the bootloader (B) uses the second data on the at least one application program (AW) and thus updates the third data.

16. The method as recited in 13, wherein the bootloader (B) uses the second data on the at least one application program (AW) and thus updates the third data.

* * * * *

UNITED STATES PATENT AND TRADEMARK OFFICE
CERTIFICATE OF CORRECTION

PATENT NO. : 8,412,921 B2  Page 1 of 1
APPLICATION NO. : 12/737711
DATED : April 2, 2013
INVENTOR(S) : Markus Fislage It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 228 days.

Signed and Sealed this

First Day of September, 2015

Michelle K. Lee
*Director of the United States Patent and Trademark Office*